(12) United States Patent
Geislinger et al.

(10) Patent No.: US 12,078,211 B2
(45) Date of Patent: Sep. 3, 2024

(54) INTERFERENCE FIT CONNECTION FOR A SHAFT

(71) Applicant: Ellergon Antriebstechnik Gesellschaft m.b.H., Hallwang (AT)

(72) Inventors: Matthias Geislinger, Hallwang (AT); Christof Sigle, Hallwang (AT)

(73) Assignee: Ellergon Antriebstechnik Gesellschaft m.b.H., Hallwang (AT)

( * ) Notice: Subject to any disclaimer, the term of this patent is extended or adjusted under 35 U.S.C. 154(b) by 103 days.

(21) Appl. No.: 17/560,662

(22) Filed: Dec. 23, 2021

(65) Prior Publication Data

US 2022/0205488 A1    Jun. 30, 2022

(51) Int. Cl.
*F16D 1/072* (2006.01)
*F16D 1/06* (2006.01)
*F16D 1/09* (2006.01)

(52) U.S. Cl.
CPC ........ *F16D 1/072* (2013.01); *F16D 2001/062* (2013.01); *F16D 2001/0906* (2013.01);
(Continued)

(58) Field of Classification Search
CPC ....... F16D 2250/0061; F16D 2001/062; F16D 2001/0903; F16D 2001/0906;
(Continued)

(56) References Cited

U.S. PATENT DOCUMENTS

| | | | | |
|---|---|---|---|---|
| 4,702,635 A | * | 10/1987 | Muellenberg | F16D 1/093 403/368 |
| 4,800,644 A | * | 1/1989 | Muellenberg | F16D 1/093 29/525.08 |

(Continued)

FOREIGN PATENT DOCUMENTS

| | | |
|---|---|---|
| DE | 2601138 A1 | 7/1977 |
| DE | 3701876 A1 * | 8/1988 |

(Continued)

OTHER PUBLICATIONS

German Search Report issued for corresponding German Patent Application No. 10 2020 135 165.8, dated Nov. 18, 2021, with partial-English translation attached.

(Continued)

*Primary Examiner* — Matthew R McMahon
(74) *Attorney, Agent, or Firm* — Myers Wolin, LLC

(57) ABSTRACT

An interference fit connection for a shaft comprises a hub having a conical through opening and a reduction sleeve having a cylindrical through opening for arrangement on the shaft and a conical outer circumference, where the cone angle of the conical outer circumference corresponds to the cone angle of the corresponding conical through opening of the hub. The hub is a two-component part having a first component made of steel and a second component made of fiber-reinforced plastics material. The second component made of fiber-reinforced plastics material is designed as a ring which is arranged on the outer circumference of a sleeve portion of the first component, which sleeve portion surrounds the reduction sleeve, so as to surround this sleeve portion. The fiber-reinforced plastics material has a higher modulus of elasticity than the steel of the first component.

20 Claims, 1 Drawing Sheet

(52) U.S. Cl.
CPC .......... *F16D 2200/0021* (2013.01); *F16D 2200/006* (2013.01); *F16D 2250/0061* (2013.01)

(58) Field of Classification Search
CPC ........ F16D 1/0829; F16D 1/091; F16D 1/093; F16D 1/095; F16D 2200/0021; F16D 2200/0052; F16D 2200/006; F16D 1/072; F16D 1/076; F16B 3/06
See application file for complete search history.

(56) References Cited

U.S. PATENT DOCUMENTS

| | | | | |
|---|---|---|---|---|
| 7,192,213 | B2 * | 3/2007 | Mermoz | ............ F16C 3/023 403/1 |
| 2006/0258469 | A1 | 11/2006 | Dewhirst et al. | |
| 2013/0028653 | A1 * | 1/2013 | Boeing | ............ F16D 1/096 403/1 |
| 2013/0170903 | A1 * | 7/2013 | Moka | ............ F16B 3/06 403/374.1 |

FOREIGN PATENT DOCUMENTS

| | | | | |
|---|---|---|---|---|
| DE | 19635542 | A1 | 3/1998 | |
| DE | 19828628 | C1 | 2/2000 | |
| DE | 102010037611 | A1 | 3/2012 | |
| DE | 202011108286 | U1 * | 4/2012 | ............ F16D 1/095 |
| WO | 2004063586 | A1 | 7/2004 | |
| WO | 2019206556 | A1 | 10/2019 | |

OTHER PUBLICATIONS

The extended European search report issued by the European Patent Office for European Patent Application No. 21215331.6, dated May 20, 2022.

Examination report No. 1 for issued by the Australian Patent Office for Australian Patent Application No. 2021286413, dated Mar. 24, 2023.

* cited by examiner

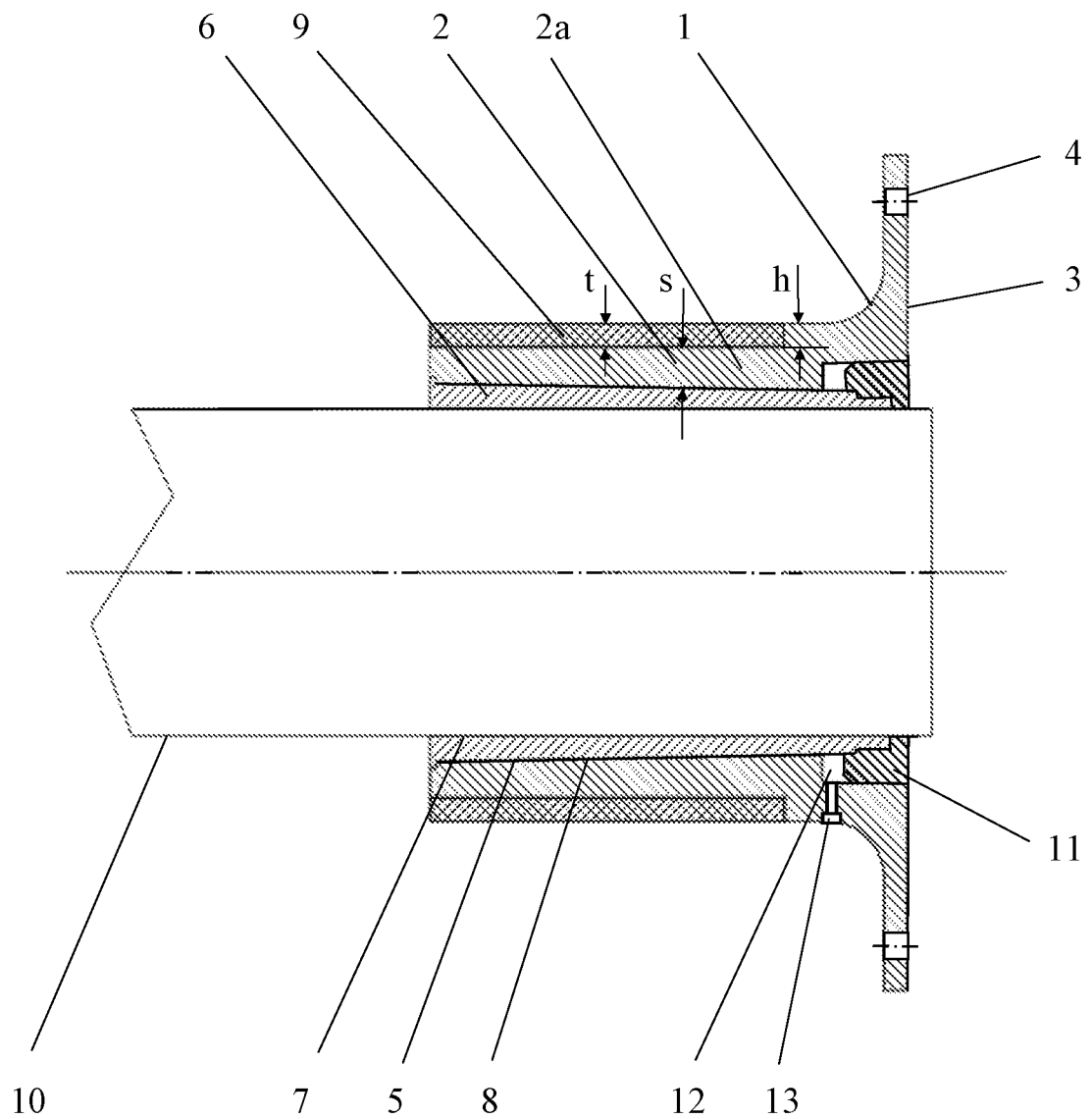

INTERFERENCE FIT CONNECTION FOR A SHAFT

CROSS REFERENCE TO RELATED APPLICATIONS

This application claims priority under 35 USC § 119 to German Patent Application No. DE 10 2020 135 165.8, filed on Dec. 31, 2020, the contents of which are incorporated herein by reference.

FIELD OF THE INVENTION

The invention relates to an interference fit connection for a shaft, comprising a hub having a conical through opening and a reduction sleeve having a cylindrical through opening for arrangement on the shaft and a conical outer circumference, the cone angle of the conical outer circumference corresponding to the cone angle of the conical through opening of the hub.

BACKGROUND

This type of interference fit connection is known, for example, from DE 196 35 542 C2.

Conventional interference fit connections, with which, for example, a flange can be attached to a shaft, often have a very high component weight due to their solid design.

Shafts made of fiber composite materials, which are characterized by a particularly low mass, are often used in drive trains of ships, in power generation, in heavy machinery and industrial plants. It is therefore not very desirable to dilute the weight advantages achieved with great complexity by adding heavy individual components.

Often the object is to couple a lightweight drive shaft made of a fiber composite material to a steel shaft. For example, in the drive train of a ship, the drive train coming from the engine is preferably made as a hollow shaft made of fiber composite material, while the shaft carrying the propeller must be made of steel. For coupling to the hollow shaft made of fiber composite material, a flange is attached to the steel shaft, which flange can be screwed to a corresponding flange of the hollow shaft. The flange is intended to be attached to the steel shaft with an interference fit connection, which in the present case should be as lightweight as possible, but must also be able to transmit high drive torques.

DE 198 28 628 C1 discloses a conventional interference fit connection in which a strip or band made of steel is wound several times around the outer circumference of an outer ring having a conical through opening for transmitting higher torque without increasing the size. The strip or band is a structure separate from the outer ring. Further, DE 198 28 628 C1 discloses one or more rings made of steel or fiber-reinforced plastic, which are press-fitted on the outer circumference of the outer ring, which renders assembly complicated.

DE 10 2010 037 611 A additionally teaches a strip or band of steel or carbon fiber to be pre-tensioned with a load of 50 to 450 N/mm$^2$ to thereby cause compressive stress directed radially inwardly within the outer ring. The strip or band is wound around 150 times around the hub. Again, the hub is not a two-component part.

DE 2601138 A1 discloses a conventional interference fit connection in which ring made of steel is press-fitted on the outer circumference of an outer ring having a conical through opening. This, however, significantly increases the outer diameter and overall weight.

An object of the present invention is to provide an interference fit connection, especially for coupling a lightweight drive shaft made of a fiber composite material to a steel shaft, which is as lightweight as possible, but also be able to transmit high drive torques.

SUMMARY

For this purpose, an interference fit connection for a shaft according to claim 1 is proposed. The interference fit connection according to the invention is characterized in particular in that the hub is a two-component part having a first component made of steel and a second component made of fiber-reinforced plastics material, the second component made of fiber-reinforced plastics material is designed as a ring that is arranged on the outer circumference of a sleeve portion of the first component, which sleeve portion surrounds the reduction sleeve, so as to surround this sleeve portion and the fiber-reinforced plastics material has a higher modulus of elasticity than the steel of the first component.

By reinforcing the sleeve portion of the hub on the outside by means of a ring made of fiber-reinforced plastics material, significantly higher stiffnesses can be achieved with the same dimensions compared to a steel ring.

Due to the lower specific density, the arrangement of the ring on the outside of the sleeve portion made of steel increases the radial stiffness in the region of the interference fit at a significantly reduced weight.

Particular embodiments of the invention form the subject matter of further claims.

For example, the hub may have said sleeve portion, which is elongate, and a flange portion which protrudes radially from the sleeve portion and is provided with attachment structures for coupling to a further component.

Preferably, the sleeve portion made of steel can have a steplike radially gradated region. In this case, the ring made of fiber-reinforced plastics material is arranged in the gradated region and to a certain extent replaces the steel material of the gradation.

In a preferred variant of the embodiment, the radial wall thickness of the ring made of fiber-reinforced plastics material corresponds to the level of gradation of the gradated region of the sleeve portion. In this way, a smooth transition between the steel and the fiber composite material can be achieved on the outer circumference.

The ratio of the wall thickness of the ring made of fiber-reinforced plastics material to the wall thickness of the underlying sleeve portion is preferably 0.5 to 2.

Preferably, the second component comprises a primary material, wherein the primary material is directly applied to the steel of the first component and cured there.

The ring can be manufactured from prepregs, preferably placed around the sleeve portion.

However, the ring may also be individually wound and resin added for curing. With regard to optimal utilization of the fibers, however, a wound ring is preferably used in which the fibers are wound in the circumferential direction of the ring.

The ring can initially be manufactured as a separate component and can then be attached to the sleeve portion. However, it is also possible to wind the fiber windings directly on the sleeve portion of the hub.

Preferably, the ring is made from unidirectional layers applied in such a way that, in the circumferential direction, the fibers thereof are positioned around the reduction sleeve and around the gradated region of the sleeve portion.

With regard to the intended use, the fibers in the ring are preferably high-modulus carbon fibers.

High-modulus fibers having a modulus of elasticity greater than 370 GPa are preferably used here.

To ensure a non-positive connection when transmitting high torques, friction-increasing measures can be taken in the contact region between the conical through opening of the hub and the conical outer circumference of the reduction sleeve and/or in the contact region between the cylindrical inner circumference of the reduction sleeve and the shaft.

In an advantageous variant of the embodiment, the conical outer circumference of the reduction sleeve can have a hardened surface quality comprising an average roughness Ra in the range of from 1.5 to 15 μm in order to achieve a high coefficient of friction toward the hub. Said hub has a lower hardness at its conical through opening than the corresponding surface of the reduction sleeve, so that the hardened micro-projections and depressions on the outer circumference of the reduction sleeve dig into the material of the hub.

Alternatively or in addition, the cylindrical inner circumference of the reduction sleeve for radial contact against the shaft can also have a hardened surface quality comprising an average roughness Ra in the range of from 1.5 to 15 so that here, too, when a softer surface is used on the hub, a very high coefficient of friction can be achieved.

To facilitate assembly, according to a further variant of the embodiment, a closure plug is attached to the reduction sleeve, which plug axially closes a chamber formed between the hub and the reduction sleeve. Furthermore, at least one hydraulic connection is provided on the hub in order to apply a hydraulic medium to the chamber for pressing the hub onto the reduction sleeve. The hub can therefore be hydraulically axially pressed onto the reduction sleeve previously arranged on the shaft. After assembly, the hydraulic medium can be removed. In comparison to pressing on by means of an axial screw connection, the hub and the reduction sleeve can hereby be designed to be considerably less solid, which also has a very favorable effect on a low overall weight of the interference fit connection.

According to another embodiment of the invention the interference fit connection for a shaft comprises a hub having an elongate sleeve portion, a flange portion which protrudes radially from the sleeve portion and is provided with attachment structures for coupling to a further component, and a conical through opening; and a reduction sleeve having a cylindrical through opening for arrangement on the shaft and a conical outer circumference, the cone angle of the conical outer circumference corresponding to the cone angle of the corresponding conical through opening of the hub, wherein the hub is a two-component part having a first component made of steel and a second component made of fiber-reinforced plastics material, the fiber-reinforced plastics material having a higher modulus of elasticity than the steel of the first component; wherein the second component made of fiber-reinforced plastics material is designed as a ring which is arranged on the outer circumference of a sleeve portion of the first component, which sleeve portion surrounds the reduction sleeve, so as to surround this sleeve portion, and wherein sleeve portion has a radially gradated region reduced in diameter to form a step and the ring made of fiber-reinforced plastics material is arranged in the gradated region.

According to another embodiment of the invention interference fit connection for a shaft comprises a hub having a conical through opening; and a reduction sleeve having a cylindrical through opening for arrangement on the shaft and a conical outer circumference, the cone angle of the conical outer circumference corresponding to the cone angle of the corresponding conical through opening of the hub; wherein the hub is a two-component part having a first component made of steel and a second component made of fiber-reinforced plastics material, the fiber-reinforced plastics material having a higher modulus of elasticity than the steel of the first component; wherein the second component made of fiber-reinforced plastics material is designed as a ring which is arranged on the outer circumference of a sleeve portion of the first component, which sleeve portion surrounds the reduction sleeve, so as to surround this sleeve portion; wherein the second component comprises a primary material, wherein the primary material is directly applied to the steel of the first component and cured there, the ring being made from one selected from prepregs, fibers wound in the circumferential direction of the ring.

BRIEF DESCRIPTION OF THE DRAWINGS

The invention will be explained in more detail below with reference to an embodiment shown in the drawing, in which:

FIG. 1 is a longitudinal sectional view of an embodiment for an interference fit connection according to the invention.

DETAILED DESCRIPTION OF THE PREFERRED EMBODIMENTS

The interference fit connection shown in FIG. 1 is used, for example, to attach a flange 1, also referred to below as a hub 1, to a shaft 10. The shaft 10 can be designed as a solid or hollow shaft. It is preferably made of steel. The flange 1 can be connected, for example, to a corresponding flange of a shaft made of fiber composite material.

The interference fit connection explained in more detail below can, however, also be used for other purposes, in particular those in which a low weight is of great interest.

The interference fit connection initially comprises the hub 1 which has already been mentioned. This hub 1 has an elongate sleeve portion 2 and a flange portion 3 which protrudes radially therefrom. Attachment structures such as through openings 4 for coupling to a further component can be provided on the flange. A conical through opening 5 extends through the hub 1.

Furthermore, the interference fit connection comprises a reduction sleeve 6, which is located between the hub 1 and the shaft 10 in the installed state.

The reduction sleeve 6 has a cylindrical through opening 7 for arrangement on the shaft 10 and also a conical outer circumference 8 for engagement with the conical through opening 5 of the hub 1.

The cone angle of the conical outer circumference 8 of the reduction sleeve 6 corresponds to the cone angle of the conical through opening 5 of the hub 1.

In the present case, the hub 1 is designed as a two-component part comprising a first component made of steel and a second component made of fiber-reinforced plastics material.

Here, the second component made of fiber-reinforced plastics material is designed as a ring 9 which is arranged on the outer circumference of the sleeve portion 2 of the first component. The ring 9 is integrally fitted on the outer circumference of the sleeve portion 2 of the first component and surrounds said outer circumference. As a result, the first component is reinforced in the region of receiving the reduction sleeve 6. For this purpose, the fiber-reinforced plastics material has a higher modulus of elasticity than the steel of the first component.

In the illustrated embodiment, the sleeve portion 2 forms a radially gradated region 2a, while the ring 9 made of fiber-reinforced plastics material is arranged in the gradated region 2a.

In the simplest case, the ring 9 is designed in the manner of a cylindrical sleeve. The radial wall thickness t of the ring 9 made of fiber-reinforced plastics material can correspond to the height h of the step of the steplike gradated region 2a of the sleeve portion 2, which ideally results in a smooth transition in the region of the sleeve portion 2 between the steel and fiber composite components. However, an edge can also be permitted at this point.

The ratio of the wall thickness t of the ring 9 made of fiber-reinforced plastics material to the wall thickness s of the underlying sleeve portion is preferably in the range of from 0.5 to 2.

The ring 9 can be manufactured and attached to the first component in different ways. It is thus possible to first manufacture said ring as a component made of fiber-reinforced plastics material and then to assemble the finished ring 9 on the steel component. Thermal joining processes, for example, can be used for this purpose. It is also possible to apply the primary material for the ring 9 directly to the steel component and to cure it there.

Prepregs can be used to manufacture the ring. However, a more flexible choice of material allows the ring to be individually wound and the resin desired in each case to be added for curing.

When using prepregs, the fibers can be in the form of woven fabrics or non-woven fabrics. However, unidirectional layers are preferably used in such a way that, in the circumferential direction, the fibers are positioned around the reduction sleeve 6 and around the gradated region 2a of the sleeve portion 2.

In the case of winding the fibers, they are wound in the circumferential direction of the ring 9, i.e. also wound around the reduction sleeve 6 and the gradated region 2a of the sleeve portion 2.

The fibers of the fiber composite material have a modulus of elasticity greater than 370 GPa.

High-modulus carbon fibers are preferably used on the ring 9.

In order to increase the coefficients of friction in the interference fit and thus to increase the torque transmission capacity, measures to increase friction can preferably be carried out on the intermediate ring 6.

In the illustrated embodiment, the conical outer circumference 8 of the intermediate ring 6 has a hardened surface quality comprising an average roughness Ra in the range of from 1.5 to 15 The corresponding conical through opening 5 has a lower hardness, so that the micro-projections on the conical outer circumference 8 claw into the softer material of the first component of the hub 1.

In the same way, to increase the friction toward the shaft 10, the inner circumference of the cylindrical through opening 7 of the reduction sleeve 6 can have a hardened surface quality comprising an average roughness Ra in the range of from 1.5 to 15 μm.

The interference fit connection explained above is preferably joined hydraulically. In this case, in one embodiment, the reduction sleeve 6 is first pushed onto the shaft 10. If necessary, the reduction sleeve 6 can first be heated for this purpose. The hub 1 is then assembled on the reduction sleeve. Said hub is first pushed axially onto the reduction sleeve 6 as far as possible. To allow a hydraulic force to be applied for the purpose of subsequent pressing on, a closure plug 11 is attached to the reduction sleeve 6 and axially closes a chamber 12 formed between the hub 1 and the reduction sleeve 6. Furthermore, at least one hydraulic connection 13 is provided on the hub 1 in order to apply a hydraulic medium to the chamber 12 for pressing the hub 1 onto the reduction sleeve 6. Said reduction sleeve is discharged again after assembly.

The configuration explained above allows significant weight saving compared to conventional one-component hubs made of steel.

The hydraulic assembly also contributes to this, allowing a particularly compact design.

This can be further increased by the friction-increasing measures explained above, in particular on the reduction sleeve 6, since this allows high torques to be transmitted in a non-positive manner.

The invention has been explained in detail above with reference to an embodiment and further variants. The embodiment and the variants serve to prove the feasibility of the invention. Technical individual features which were explained above in the context of further individual features can also be implemented independently of said further individual features and in combination with other individual features, even if this is not expressly described, as long as this is technically possible. The invention is therefore expressly not limited to the embodiment specifically described and the variants explained above, but includes all embodiments defined by the claims.

LIST OF REFERENCE SIGNS

1 Hub
2 Sleeve portion
2a Gradated region
3 Flange portion
4. Attachment structure
5 Conical through opening
6. Reduction sleeve
7. Cylindrical through opening
8. Conical outer circumference
9 Ring
10 Shaft
11 Closure plug
12. Chamber
13 Hydraulic connection
h Height of gradation
s Mean wall thickness of the first component in the gradated region 2a
t Wall thickness of the ring 9

What is claimed is:

1. An interference fit connection for a shaft (10), comprising:
    a hub (1) having a conical through opening (5), and
    a reduction sleeve (6) having a cylindrical through opening (7) for arrangement on the shaft (10) and a conical outer circumference (8), the cone angle of the conical outer circumference (8) corresponding to the cone angle of the corresponding conical through opening (5) of the hub (1),
    wherein
    the hub (1) is a two-component part having a first component made of steel and a second component made of fiber-reinforced plastics material,
    the second component made of fiber-reinforced plastics material is designed as an endless ring (9) which is arranged on the outer circumference of a sleeve portion (2) of the first component, which sleeve portion surrounds the reduction sleeve, so as to surround this sleeve portion (2), the fiber-reinforced plastics material having a higher modulus of elasticity than the steel of the first component.

2. The interference fit connection according to claim 1, wherein the hub (1) has said sleeve portion (2), which is elongate, and a flange portion (3) which protrudes radially from the sleeve portion (2) and is provided with attachment structures for coupling to a further component.

3. The interference fit connection according to claim 1, wherein the sleeve portion (2) has a radially gradated region (2a) reduced in diameter to form a step and the endless ring (9) made of fiber-reinforced plastics material is arranged in the gradated region (2a).

4. The interference fit connection according to claim 3, wherein the radial wall thickness (t) of the ring (9) made of fiber-reinforced plastics material corresponds to the height (h) of the step of the gradated region (2a).

5. The interference fit connection according to claim 3, wherein the endless ring (9) is made from unidirectional layers applied in such a way that, in the circumferential direction, the fibers thereof are positioned around the reduction sleeve (6) and around the gradated region (2a) of the sleeve portion (2).

6. The interference fit connection according to claim 1, wherein the ratio of the wall thickness (t) of the endless ring (9) made of fiber-reinforced plastics material to the wall thickness (s) of the underlying sleeve portion (2) of the first component is 0.5 to 2.

7. The interference fit connection according to claim 1, wherein, the second component comprises a primary material, wherein the primary material is directly applied to the steel of the first component and cured there.

8. The interference fit connection according to claim 7, wherein the endless ring (9) comprises resin and prepregs cured to form the endless ring.

9. The interference fit connection according to claim 1, wherein the second component comprises a primary material, wherein the primary material is directly applied to the steel of the first component and cured there, and wherein the endless ring (9) is individually wound and resin added for curing.

10. The interference fit connection according to claim 1, wherein the fibers of the fiber composite material in the endless ring (9) are wound in the circumferential direction thereof.

11. The interference fit connection according to claim 1, wherein the fibers of the fiber composite material in the endless ring (9) are high-modulus carbon fibers.

12. The interference fit connection according to claim 11, wherein the fibers of the fiber composite material in the endless ring (9) have a modulus of elasticity greater than 370 GPa.

13. The interference fit connection according to claim 1, wherein the conical outer circumference (8) of the reduction sleeve (6) has a hardened surface quality comprising an average roughness Ra in the range of from 1.5 to 15 µm.

14. The interference fit connection according to claim 13, wherein the inner circumference of the cylindrical through opening (7) of the reduction sleeve (6) has a hardened surface quality comprising an average roughness Ra in the range of from 1.5 to 15 µm for radial contact against the shaft.

15. The interference fit connection according to claim 1, wherein a chamber (12) is formed between the hub (1) and the reduction sleeve (6), a closure plug (11) is attached to the reduction sleeve (6), which plug axially closes said chamber (12) formed between the hub (1) and the reduction sleeve (6) and wherein at least one hydraulic connection (13) is provided on the hub (1) in order to apply a hydraulic medium to the chamber (12) for pressing the hub (1) onto the reduction sleeve (6).

16. An interference fit connection for a shaft (10), comprising
a hub (1) having an elongate sleeve portion (2), a flange portion (3) which protrudes radially from the sleeve portion (2) and is provided with attachment structures for coupling to a further component, and a conical through opening (5);
a reduction sleeve (6) having a cylindrical through opening (7) for arrangement on the shaft (10) and a conical outer circumference (8), the cone angle of the conical outer circumference (8) corresponding to the cone angle of the corresponding conical through opening (5) of the hub (1),
wherein the hub (1) is a two-component part having a first component made of steel and a second component made of fiber-reinforced plastics material, the fiber-reinforced plastics material having a higher modulus of elasticity than the steel of the first component;
wherein the second component made of fiber-reinforced plastics material is designed as a ring (9) which is arranged on the outer circumference of a sleeve portion (2) of the first component, which sleeve portion surrounds the reduction sleeve, so as to surround this sleeve portion (2), and
wherein sleeve portion (2) has a radially gradated region (2a) reduced in diameter to form a step and the ring (9) made of fiber-reinforced plastics material is arranged in the gradated region (2a).

17. The interference fit connection according to claim 16, wherein the second component comprises a primary material, wherein the primary material is directly applied to the steel of the first component and cured there.

18. The interference fit connection according to claim 17, wherein the ring (9) is made from prepregs.

19. The interference fit connection according to claim 16, wherein the second component comprises a primary material, wherein the primary material is directly applied to the steel of the first component and cured there, and wherein the fibers of the fiber composite material in the ring (9) are wound in the circumferential direction thereof and resin is added for curing.

20. An interference fit connection for a shaft (10), comprising
a hub (1) having a conical through opening (5); and
a reduction sleeve (6) having a cylindrical through opening (7) for arrangement on the shaft (10) and a conical outer circumference (8), the cone angle of the conical outer circumference (8) corresponding to the cone angle of the corresponding conical through opening (5) of the hub (1);
wherein the hub (1) is a two-component part having a first component made of steel and a second component made of fiber-reinforced plastics material, the fiber-reinforced plastics material having a higher modulus of elasticity than the steel of the first component;
wherein the second component made of fiber-reinforced plastics material is designed as an endless ring (9) which is arranged on the outer circumference of a sleeve portion (2) of the first component, which sleeve portion surrounds the reduction sleeve, so as to surround this sleeve portion (2); and wherein the second component comprises a primary material, wherein the primary material comprises resin and one or more selected from prepregs and fibers wound in the circumferential direction of the endless ring (9) and cured to form the endless ring.

\* \* \* \* \*